United States Patent [19]
Fukuhara et al.

[11] 4,370,551
[45] Jan. 25, 1983

[54] FOCUS DETECTING DEVICE

[75] Inventors: Toru Fukuhara, Isehara; Ken Utagawa, Yokohama, both of Japan

[73] Assignee: Nippon Kogaku K.K., Tokyo, Japan

[21] Appl. No.: 242,886

[22] Filed: Mar. 12, 1981

[30] Foreign Application Priority Data

Mar. 18, 1980 [JP] Japan .................................. 55-33383
Oct. 24, 1980 [JP] Japan ................................. 55-150971

[51] Int. Cl.³ .............................................. G01J 1/20
[52] U.S. Cl. .................................... 250/201; 250/204
[58] Field of Search ............. 250/201, 204; 354/25 R; 356/4

[56] References Cited
U.S. PATENT DOCUMENTS 4,047,022  9/1977  Holle .................................. 250/201

*Primary Examiner*—David C. Nelms
*Assistant Examiner*—Darwin R. Hostetter
*Attorney, Agent, or Firm*—Fitzpatrick, Cella, Harper & Scinto

[57] ABSTRACT

A focus detecting device has an objective lens, a pair of re-imaging lenses for receiving the light imaged by the objective lens to form a first and a second image, respectively, a pair of focus detecting photoelectric converters disposed near the focal planes of the pair of re-imaging lenses, respectively, the pair of photoelectric converters being adapted to produce photoelectric outputs corresponding to the position changes of the first and second images caused on the photoelectric converters by movement of the objective lens in the direction of the optical axis, and detecting means for receiving the outputs from the pair of photoelectric converters and detecting whether or not the objective lens is in its in-focus condition. The pair of re-imaging lenses are provided so that the F-number thereof in a direction perpendicular to the direction of movement of the images is smaller than the F-number thereof in the direction of movement of the images position-changed on the photoelectric converters.

3 Claims, 11 Drawing Figures

FOCUS DETECTING DEVICE

BACKGROUND OF THE INVENTION

1. Field of the Invention

This invention relates to a focus detecting device.

2. Description of the Prior Art

There has heretofore been a focus detecting optical device of a single lens reflex camera in which light passed through a phototaking objective lens is directed to the outside of the phototaking light bath by a quick return mirror and after the light directed to the outside of the light path has been imaged, a first and a second image are obtained from this light through a first and a second re-imaging lens. In such device, photoelectric converters are disposed near the focal planes of the first and second re-imaging lenses and whether or not the phototaking objective lens is in in-focus position is detected by way of the movements of the first and second images on the photoelectric converters which occur when the phototaking objective lens is moved in the direction of the optical axis.

In FIGS. 1 and 2 of the accompanying drawings which illustrate the above-described focus detecting device of a single lens reflex camera, L designates a phototaking objective lens, M denotes a quick return mirror, S designates a focusing screen which is transparent in the neighborhood of the optical axis, L1 denotes re-imaging lenses, and P designates photoelectric converters. The light passed through the lens L is directed onto the focusing screen S via the quick return mirror M which is in observation position, but in FIGS. 1 and 2, the light path is developed for the sake of convenience and the lens L, quick return mirror M, re-imaging lenses L1 and photoelectric converters P are all shown as being disposed on a single plane. In this device, the light passed through the phototaking objective lens L is imaged on its focal plane (i.e., on the focusing screen S), passes through a transparent portion formed in the center of the focusing screen S, and is directed through the pair of re-imaging lenses L1 onto the photoelectric converters P corresponding to the re-imaging lenses L1. Since each photoelectric converter P is disposed near the focal plane of each re-imaging lens L1, the light directed onto each photoelectric converter is again imaged on that photoelectric converter. When the phototaking objective lens L is moved in the direction of the optical axis (the direction z), the image formed on each photoelectric converter P moves in the direction x on the surface of this converter P. Detecting means D receives the outputs of the two converters P and detects the in-focus condition of the phototaking objective lens. As the photoelectric converters, use may be made of photodiode arrays or the like.

Description will now be made of conditions with which the focus detecting device must be provided. The focus detecting device must be provided with the condition (1) that it be high in detection accuracy of in-focus and non-in-focus and the condition (2) that it be capable of detecting in-focus even for an object of low brightness.

In the above-described prior art device, the greater the opening angle between the optical axis of the re-imaging lens L1 and the optical axis of the phototaking objective lens L, namely, the angle $\theta$ in FIG. 1, the higher the accuracy of focus detection. This is because, when the phototaking objective lens L is moved a predetermined amount in the direction of the optical axis, the amounts of movement of the first and second images on the photoelectric converters P are greater as the angle $\theta$ is greater. Also, as the F-number of the re-imaging lenses L1 is smaller, that is, as $\alpha$ in FIG. 1 is greater, the lenses are brighter and the outputs of the photoelectric converters P are greater and therefore, focus detection becomes possible even for an object of low brightness.

However, with the above-described prior art device, it is difficult to satisfy both the conditions (1) and (2). That is, in FIGS. 1 and 2, even the light ray 11 incident on the most marginal portion of the re-imaging lens L1 must be one that has left the exit pupil of the phototaking objective lens L and therefore, $\alpha$, $\beta$ and $\theta$ must satisfy the following relation:

$$\beta \geq \alpha/2 + \theta$$

If, for this reason, $\alpha$ is selected to a great value to render the re-imaging lenses L1 bright on the basis of the condition (2), as shown in FIG. 1, $\theta$ will become small and the condition (1) will be sacrificed, because $\beta$ has been determined by the size of the exit pupil of the objective lens and the distance between the objective lens L and the focusing screen S. If $\theta$ is selected to a great value on the basis of the condition (1), as shown in FIG. 2, $\alpha$ will become small and the condition (2) will be sacrificed, because $\beta$ has again been determined to a predetermined value.

SUMMARY OF THE INVENTION

It is an object of the present invention to overcome the above-noted disadvantages and to provide a focus detecting device which is high in accuracy of focus detection and which is capable of focus detection even for objects of low brightness.

The invention will become fully apparent from the following detailed description thereof taken in conjunction with the accompanying drawings.

DESCRIPTION OF THE PREFERRED EMBODIMENTS

Embodiments of the present invention will hereinafter be described.

Figure 1:
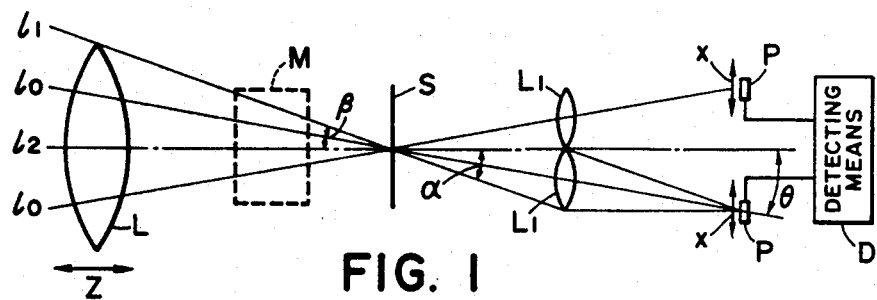
FIGS. 1 and 2 illustrate examples of the prior art.
Figure 2:
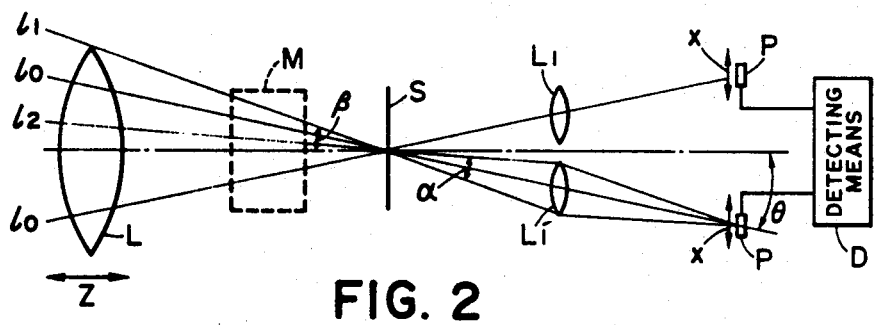
Figure 3:
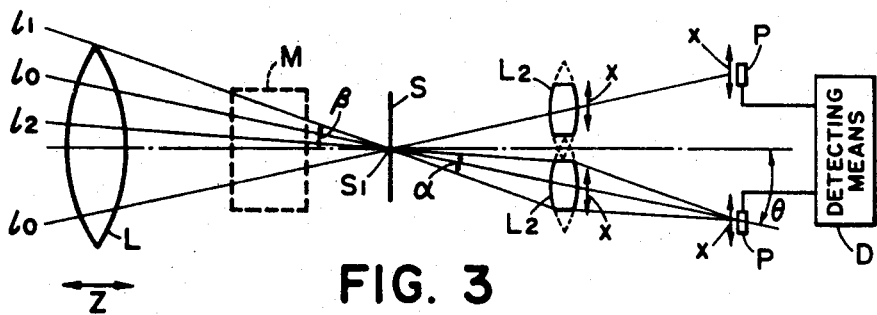
FIG. 3 illustrates a first embodiment of the present invention.
Figure 4:
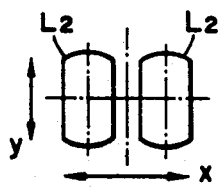
FIG. 4 is a view of the re-imaging lenses in FIG. 3 as seen in the direction of the optical axis.
Figure 5:
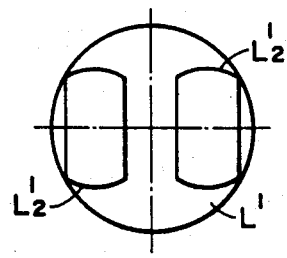
FIG. 5 is a view of the re-imaging lenses as projected upon the exit pupil plane of the phototaking objective lens.

Referring to FIGS. 3, 4 and 5, there is shown a first embodiment of the present invention. In FIGS. 3 to 10, elements similar to those in FIGS. 1 and 2 are given similar reference characters. In the first embodiment, each of re-imaging lenses L2 assumes a shape in which a circle has been cut away at the diametrically opposite portions thereof as shown in FIG. 4, and the F-number thereof in the direction x in FIG. 3 is great and the F-number thereof in the direction y perpendicular to the direction x is small. Accordingly, in this device, even if θ is set to a great value, the light ray 11 incident on the edge end portion of the re-imaging lens L2 is one which has emerged from the exit pupil of the phototaking objective lens L. Thus, the aforementioned condition (1) is satisfied.

On the other hand, satisfying the aforementioned condition (2) is achieved by pre-rendering the F-number of each re-imaging lens L2 in the direction y small to such a degree that the reduction in output of the photoelectric conversion elements which is caused by having cut away the diametrically opposite portions of each re-imaging lens L2 is almost inappreciable as compared with the case of FIG. 1. The general condition which determines the opening angle θ and the F-numbers of the re-imaging lenses L2 in the directions x and y is that, as shown in FIG. 5, when the pupils of the re-imaging lenses L2 are projected upon the exit pupil plane L' of the phototaking objective lens L in point-symmetry with respect to the focus S1 of the objective lens L, the projected images L'2 are contained in the exit pupil plane L'.

Figure 6:
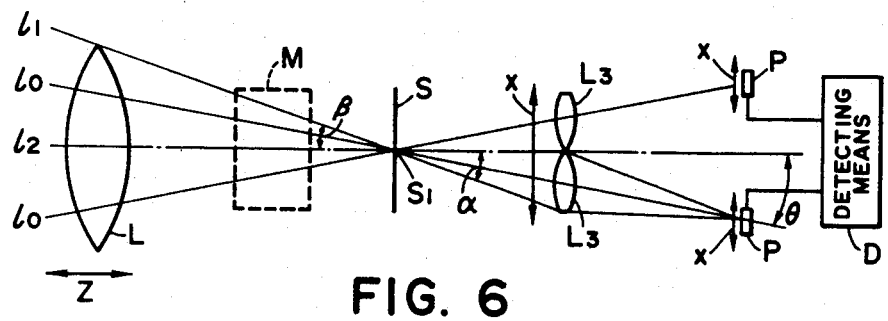
FIG. 6 illustrates a second embodiment of the present invention.
Figure 7:
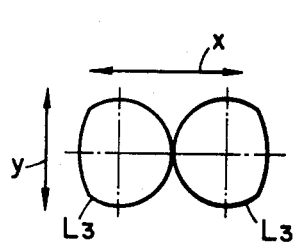
FIG. 7 is a view showing the re-imaging lenses of FIG. 6.
Figure 8:
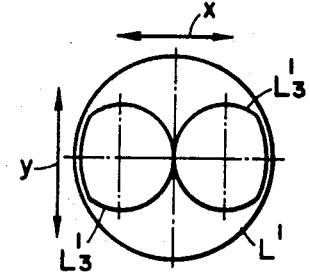
FIG. 8 is a view of the re-imaging lenses as projected upon the exit pupil plane of the phototaking objective lens in the second embodiment.

In a second embodiment illustrated in FIGS. 6 to 8, each of a pair of re-imaging lenses L3 assumes a shape as shown in FIG. 7 wherein a circle has been cut away at one end portion (the outer end portion) along the arc of a circle centered at the optical axis of the phototaking lens L. Accordingly, the angle α in the direction x in FIG. 6 is smaller than the angle α in the direction y perpendicular to the direction x and therefore, the F-number in the direction x is greater than the F-number in the direction y. Accordingly, even if θ is set to a great value, the light ray 11 incident on the edge end portion of the re-imaging lens L3 is one which has emerged from the exit pupil of the phototaking objective lens L, as shown in FIG. 6. Thus, the aforementioned condition (1) is satisfied.

On the other hand, satisfying the aforementioned condition (2) is achieved by pre-rendering the F-number of each re-imaging lens L3 in the direction y small to such a degree that the reduction in output of the photoelectric conversion elements which is caused by having cut away the end portion of each re-imaging lens L3 is most inappreciable as compared with the case of FIG. 1. That is, the increase in the F-number of each re-imaging lens L3 in the direction x can be compensated for by the decrease in the F-number in the direction y, thereby minimizing the reduction in output.

Figure 9:
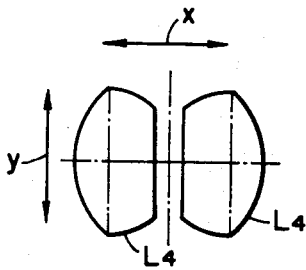
FIGS. 9 and 10 are views similar to FIGS. 7 and 8, respectively, but showing a third embodiment of the present invention.

In a third embodiment shown in FIG. 9 which is an improvement over the second embodiment, each re-imaging lens L4 assumes a shape in which it has been cut away at the diametrically opposite portions thereof, and this embodiment can reduce the F-number of each re-imaging lens L4 in the direction y as compared with the embodiment of FIG. 7. Accordingly, this embodiment is more advantageous with respect to the aforementioned condition (2).

The third embodiment is entirely similar in construction to the second embodiment except that the shape of the re-imaging lenses L4 is made different from the shape of the re-imaging lenses of the second embodiment.

Figure 10:
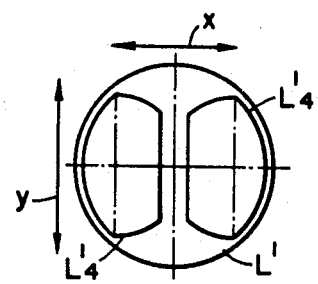

The general condition which determines the opening angle θ and the F-numbers of the re-imaging lenses L3, L4 in the directions x and y is that, as shown in FIGS. 8 and 10, when the pupils of the re-imaging lenses L3, L4 are projected upon the exit pupil plane L' of the phototaking objective lens L in point-symmetry with respect to the focus S1 of the objective lens L, the projected images L'3, L'4 are contained in the exit pupil L'.

Figure 11:
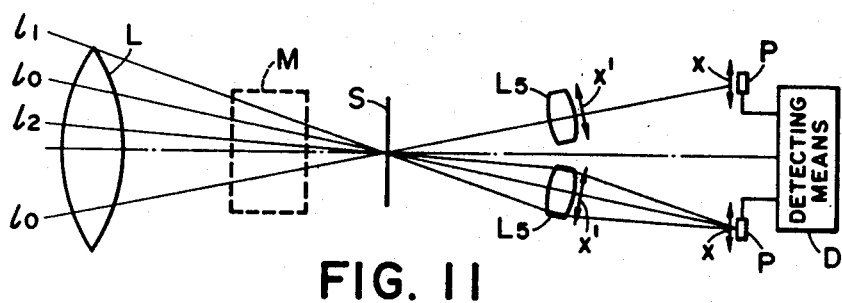
FIG. 11 illustrates a fourth embodiment of the present invention.

The embodiments hitherto described are examples in which the principal plane of each re-imaging lens and the light-receiving surface of each photoelectric converter are entirely parallel. Accordingly, the direction x in which the image moves on each photoelectric converter P is completely coincident with the direction x in which the F-number of each re-imaging lens is increased. However, the direction x in which the image moves on each photoelectric converter P need not always be coincident with the direction in which the F-number of each re-imaging lens is increased. FIG. 11 shows a fourth embodiment which is such an example. The fourth embodiment differs from the first embodiment only in that the re-imaging lenses L2 of the first embodiment are inclinedly disposed.

In FIG. 11, each re-imaging lens L5 is arranged with the principal plane thereof being perpendicular to the light ray 10, and each photoelectric converter P is arranged with the light-receiving surface thereof being perpendicular to the optical axis of the phototaking objective lens L. Accordingly, the principal plane of each re-imaging lens L5 and the light-receiving surface of each photoelectric converter are not completely parallel. That is, the direction x in which the image moves on each photoelectric converter P is not completely coincident with the direction x' in which the F-number of each re-imaging lens is increased. Even such a construction would not encounter any inconvenience in practice. In the case of this embodiment, the center of the light-receiving surface of each photoelectric converter P lies at the focus position of each re-imaging lens L5. As described above, in the present invention, the direction x in which the image moves on each photoelectric converter P and the direction in which the F-number of each re-imaging lens is increased need not be completely coincident, but only need be substantially coincident.

FIGS. 3, 6 and 11 show the respective arrangements with the light path therein developed, but when such an optical system is actually incorporated into a camera or the like, it would occur to mind to suitably dispose mirrors or the like between the focal plane of the objective lens and the photoelectric converters to bend the light path and utilize the space efficiently. However, even in such a case, if construction is made as in the present invention with the light path developed, it will not depart from the scope of the present invention.

Also, in the present invention, even where a field lens, not shown, is disposed at the center of the focusing screen S, if the projected image obtained when the pupil of each re-imaging lens is projected upon the exit pupil plane of the objective lens L with the influence of the refraction by the field lens added with respect to the focus S1 of the objective lens, namely, the image which is to be projected through the field lens lying at the position S1, is contained in the exit pupil of the objective lens, no inconvenience will be encountered.

In the above-described embodiments, the light passed through the phototaking objective lens L is directed to the re-imaging lenses L2, L3, L4, L5, whereas it is also possible that the light passed through another objective lens different from the phototaking objective lens L is directed to the re-imaging lenses L2, L3, L4, L5 and the in-focus position of said another objective lens is detected by way of the movement of said another objective lens in the direction of the optical axis and the detection signal is used to drive the phototaking objective lens L to its in-focus position.

The photoelectric converters P need not be disposed exactly at the focus positions of the re-imaging lenses L2, L3, L4, L5, but may be disposed near the focus positions.

As described above, the device of the present invention is one which satisfies the aforementioned conditions (1) and (2), in other words, which is high in accuracy of in-focus detection and yet is capable of in-focus detection for objects of low brightness.

We claim:

1. In a focus detecting device having an objective lens, a pair of re-imaging lenses for receiving the light imaged by said objective lens to form a first and a second image, respectively, a pair of focus detecting photoelectric converters disposed near the focal planes of said pair of re-imaging lenses, respectively, said pair of photoelectric converters being adapted to produce photoelectric outputs corresponding to the position changes of said first and second images caused on said photoelectric converters by movement of said objective lens in the direction of the optical axis, and detecting means for receiving the outputs from said pair of photoelectric converters and detecting whether or not said objective lens is in its in-focus condition, the improvement residing in that said pair of re-imaging lenses are provided so that the F-number of each re-imaging lens in a direction perpendicular to the direction of movement of the image formed thereby is smaller than the F-number of the same lens in the direction of movement of the same image position-changed on said photoelectric converters.

2. A focus detecting device according to claim 1, wherein said pair of re-imaging lenses have their shape determined so that when said pair of re-imaging lenses are projected upon the exit pupil plane of said objective lens with respect to the focus of said objective lens, the projected images are contained in said exit pupil.

3. A focus detecting device according to claim 2, wherein each of said re-imaging lenses has its shape determined so that the outer periphery of said projected image is an arc centered at the optical axis of said objective lens.

* * * * *